United States Patent
Shibao (10) Patent No.: US 9,185,242 B2
(45) Date of Patent: Nov. 10, 2015

(54) IMAGE READING APPARATUS, INFORMATION PROCESSING APPARATUS, CONTROL METHOD THEREOF, AND STORAGE MEDIUM

(75) Inventor: Koki Shibao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/333,737

(22) Filed: Dec. 21, 2011

(65) Prior Publication Data

US 2012/0162711 A1    Jun. 28, 2012

(30) Foreign Application Priority Data

Dec. 27, 2010 (JP) ................................. 2010-290331

(51) Int. Cl.
*G06F 3/12* (2006.01)
*H04N 1/00* (2006.01)
*H04N 1/04* (2006.01)

(52) U.S. Cl.
CPC ......... *H04N 1/00217* (2013.01); *H04N 1/0023* (2013.01); *H04N 1/0097* (2013.01); *H04N 1/00228* (2013.01); *H04N 1/00424* (2013.01); *H04N 1/00474* (2013.01); *H04N 1/00482* (2013.01); *H04N 1/00811* (2013.01); *H04N 1/00822* (2013.01); *H04N 2201/0039* (2013.01); *H04N 2201/0075* (2013.01); *H04N 2201/0081* (2013.01)

(58) Field of Classification Search
CPC ............ G06F 15/00; H04N 1/04; H04N 1/32; H04N 1/40; H04N 1/46
See application file for complete search history.

(56) References Cited

U.S. PATENT DOCUMENTS

| | | | | |
|---|---|---|---|---|
| 2006/0109498 | A1* | 5/2006 | Ferlitsch | 358/1.15 |
| 2007/0211296 | A1* | 9/2007 | Toda | 358/1.18 |
| 2007/0229926 | A1* | 10/2007 | Morisaki et al. | 358/527 |
| 2008/0018952 | A1* | 1/2008 | Du et al. | 358/468 |
| 2009/0059314 | A1* | 3/2009 | Liao | 358/474 |
| 2009/0231353 | A1* | 9/2009 | Han | 345/581 |

FOREIGN PATENT DOCUMENTS

| | | |
|---|---|---|
| JP | 2004-215009 A | 7/2004 |
| JP | 2006-060577 A | 3/2006 |
| JP | 2006-279654 A | 10/2006 |

\* cited by examiner

*Primary Examiner* — Fred Guillermety
*Assistant Examiner* — Henok A Shiferaw
(74) *Attorney, Agent, or Firm* — Canon USA Inc. IP Division

(57) ABSTRACT

An image reading apparatus requests an external apparatus to transmit a reading instruction. When reading the document according to the reading instruction transmitted from the external apparatus in response to the request, if a reading method for reading the document placed on a document positioning plate without conveying the document is used, the image reading apparatus displays, every time one page of the document is read, a confirmation screen for allowing a user to confirm whether to end reading the document irrespective of whether a format of a single-page file is specified or where a format of a multi-page file is specified as a format of a file to be generated from the read document.

8 Claims, 10 Drawing Sheets

IMAGE READING APPARATUS, INFORMATION PROCESSING APPARATUS, CONTROL METHOD THEREOF, AND STORAGE MEDIUM

BACKGROUND OF THE INVENTION

1. Field of the Invention

The present invention relates to an image reading apparatus, an information processing apparatus, a control method thereof, and a storage medium.

2. Description of the Related Art

A typical scanner (image reading apparatus) reading a document and generating image data has a scan method for starting to read the document according to an instruction from a scanner driver installed in a host personal computer (PC) and transmitting the generated image data to the host PC. This scan method is referred to as a pull scan method.

In recent years, in addition to the pull scan method, as another scan method, a scanner having a pseudo push scan method has been conceived (e.g., Japanese Patent Application Laid-Open No. 2004-215009). In the pseudo push scan method, a user operates an operation unit of the scanner to select the host PC in which the scanner driver is installed. The scanner sends to the selected host PC a request of "perform pull scan" to cause that PC to perform the pull scan. Subsequently, the host PC performs image processing on the image data received from the scanner and stores it in a predetermined storage location.

To perform the pseudo push scan method, the user operates not the host PC but the scanner to transmit the generated image data to a desired destination.

In either of the above-described pull scan method and pseudo push scan method, various setting values (e.g., size of paper to be read, resolution, and file format) related to scan processing are previously generated by the scanner driver. These setting values are retained in the scanner driver as profile information. To perform the pull scan method or the pseudo push scan method, the user selects desired profile information from the previously-retained profile information to perform scanning.

At this point, one of the big differences in operability between the pull scan method and the pseudo push scan method for the user is whether the user can easily confirm content of the profile information. In other words, when the pull scan method is performed, the user can easily confirm the content of the profile information on a screen of the host PC.

On the other hand, when the pseudo push scan method is performed, since an inexpensive scanner, for example, has a display unit limited in size capable of displaying only limited information, the user cannot easily confirm the content of the profile information thereon. Further, when using the inexpensive scanner, in consideration of a memory capacity and processing load on a central processing unit (CPU), the detailed content of the profile information may not be obtained from the host PC.

To perform the pull scan and the pseudo push scan, function extension for improving usability may be required. For example, in a reading method for setting a document on a document positioning glass to read the document by the scanner, it is impossible to continuously read a plurality of documents to generate an image file formed of a plurality of pages.

As described above, in a method for setting the document on the document positioning glass to read the document by the scanner, the following issue is conceivable. First, to generate a file in the format of a multi-page file such as a Portable Document Format (PDF) file, since the document having a plurality of pages need to be continuously read, the user needs to confirm whether to scan a next page of the document every time one page is scanned. On the other hand, when a file is generated in the format of a single page file such as a Joint Photographic Experts Group (JPEG) file, since one file is formed of one page, continuous reading of a plurality of pages is not necessary.

More specifically, whether to continuously read the documents varies depending on the file format of the image data generated from the read documents. Thus, when a file is generated in the format of a multi-page file, a screen is displayed for the user to confirm whether to scan the next page of the document. On the other hand, when a file is generated in the format of a single-page file, such a screen is desired to be automatically switched not to be displayed.

However, in the case of the pseudo push scan method, as described above, since the user cannot easily confirm the content of the profile information, the user may not be able to confirm the format of a file to be generated. Thus, when the user does not know the format of the file to be generated, if the screen for confirming whether to scan the next page of the document with the user is automatically switched as described above, the user may be more confused accordingly.

SUMMARY OF THE INVENTION

The present invention is directed to an image reading apparatus capable of providing an operation environment that does not confuse a user even when the user does not know the format of a file to be generated by scanning.

According to an aspect of the present invention, an image reading apparatus includes a reading unit configured to read a document, a request unit configured to request an external apparatus to transmit a reading instruction for instructing the reading unit to read the document, a reception unit configured to receive the reading instruction transmitted from the external apparatus in response to the request by the request unit, and a control unit configured to, when the reading unit reads the document according to the reading instruction received by the reception unit, if a reading method for reading the document placed on a document positioning plate without conveying the document is used, display, every time one page of the document is read, a confirmation screen for allowing a user to confirm whether to end reading the document irrespective of whether a format of a single-page file is specified or a format of a multi-page file is specified as a format of a file to be generated from the read document.

According to another aspect of the present invention, an information processing apparatus includes a specifying unit configured to specify a format of a file to be generated from a document read by an image reading apparatus, a transmission unit configured to transmit a reading instruction for instructing the image reading apparatus to read the document in response to a request from the image reading apparatus, and an instruction unit configured to, when the image reading apparatus operates in an operation mode in which the image reading apparatus reads the document according to the reading instruction transmitted by the transmission unit, if the image reading apparatus uses a reading method for reading the document placed on a document positioning plate without conveying the document, instruct the image reading apparatus to display, every time one page of the document is read, a confirmation screen for allowing a user to confirm whether to end reading the document irrespective of whether the format specified by the specifying unit is a format of a single-page file or a format of a multi-page file.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
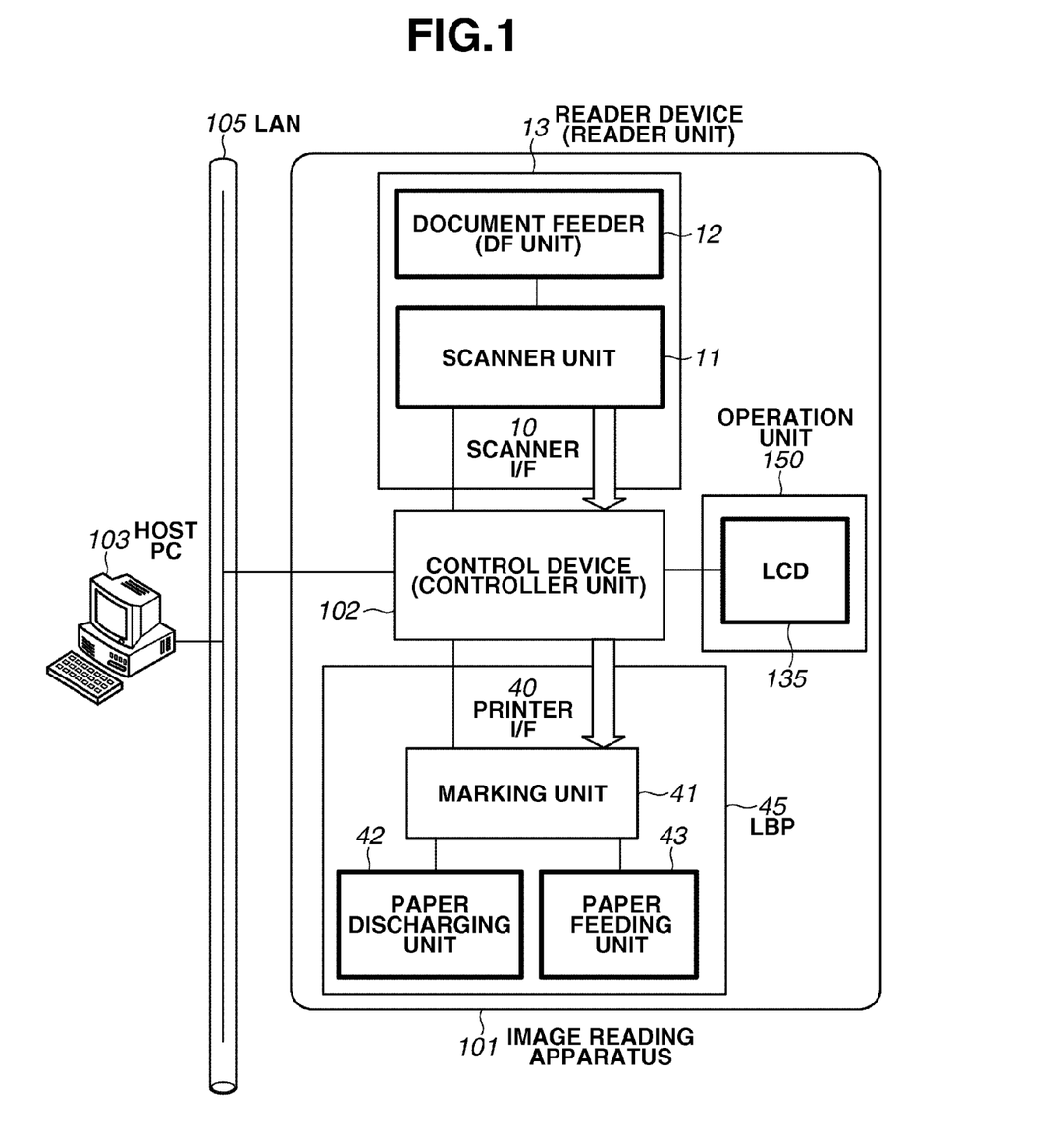
FIG. 1 is a hardware block diagram illustrating an image reading apparatus according to an exemplary embodiment of the present invention.

FIG. 1 is a hardware block diagram illustrating an image reading apparatus according to an exemplary embodiment of the present invention. A reader device 13 optically reads a document image and converts it into image data. The reader device 13 includes a scanner unit 11 having a function for optically reading the document and a document feeder (DF unit) 12 having a function for conveying document paper to a predetermined reading position of the scanner unit 11.

The image reading apparatus according to the present exemplary embodiment has a reading method in which the scanner unit 11 reads the document fed by the document feeder 12. In addition, the image reading apparatus has also a reading method in which the user places (sets) the document on a document positioning plate included in the scanner unit 11 and the set document is read without being conveyed.

To read a document formed of a plurality of pages that are separated from each other by the reading method using the document feeder 12, since the user does not need to set each document for the document feeder 12, the user can conveniently use the reading method. In description herebelow, this reading method is referred to as a "DF reading method". On the other hand, to read a document formed of a plurality of pages that are separated from each other by the method for setting the document on the document positioning plate, the user needs to change each sheet set on the document positioning plate. However, this reading method can read a document that the document feeder 12 cannot convey, such as documents bundled like a book. In descriptions herebelow, such a reading method is referred to as a "document positioning plate reading method". The reading method for reading the document by the scanner unit 11 may not be limited to the two methods described above.

A laser beam printer (LBP) unit (image output device) 45 conveys recording paper, prints the image data on the recording paper as a visible image, and then discharges the recording paper outside the device. The LBP unit 45 includes a paper feeding unit 43 including a cassette for the recording paper of a plurality of types, a marking unit 41 having a function for transferring and fixing the image data onto the recording paper, and a paper discharging unit 42 having a function for outputting outside the apparatus the printed recoding paper that has been sorted and stapled. A control device 102 is electrically connected to the reader device 13 and the LBP unit 45, and further connected to a host PC 103 via a network 105.

The control device 102 provides a copy function by controlling the reader device 13 to read the document in order to generate the image data and controlling the LBP unit 45 to output the image data onto the recording paper. Further, the control device 102 provides a function for transmitting the image data obtained from the reader device 13 to an external apparatus such as the host PC 103 via the network 105. More specifically, the image reading apparatus 101 can transmit the image data obtained from the reader device 13 to the host PC by a scan method including the pull scan method and the pseudo push scan method.

As described above, the pull scan method refers to a scan method for starting to read the document in response to an instruction from the scanner driver installed in the host PC and transmitting the generated image data to the host PC. On the other hand, the pseudo push scan method refers to a method for operating an operation unit 150 of the image reading apparatus 101 by the user to select the host PC 103 on which the scanner drier is installed.

The image reading apparatus issues a request of "perform pull scan" to the selected host PC so that the host PC can perform the pull scan. The scan methods described above are referred to as the pull scan method (or, simply, the pull scan) and the pseudo push scan method (or, simply, the pseudo push scan) hereinafter.

The operation unit 150 is connected to the control device 102 and includes a liquid crystal display (LCD) 135 and a hard key described below to provide a user interface (I/F) for operating the image reading apparatus 101. In the present exemplary embodiment, while the image reading apparatus 101 is described that includes an image output device such as a printer, the image reading apparatus 101 may not include a printer.

The host PC 103 is an example of an information processing apparatus described below, on which the scanner driver can be installed. The host PC 103 is not limited to a personal computer, but may be a mobile terminal such as a mobile phone and a personal digital assistance (PDA), and other devices.

A function of the control device 102 will be described with reference to a block diagram illustrated in FIG. 2.

A charge-coupled device (CCD) sensor 17 or a contact image sensor (CIS) 18 is connected to a scanner I/F 10 via an analog front end (AFE) 15. Thus, the control device 102 can take in the reading data without involving an individual special circuit. The scanner I/F unit 10 can deal with the CCD sensor 17 or the CIS 18 as an image reading device to perform input processing on signals from the image reading device.

The image data input here is direct-memory-access (DMA) transferred and loaded on a main memory 100 by a memory control unit 70. Only either one of the CCD sensor 17 and the CIS 18 is normally connected. However, both of them may be connected. Further, the AFE 15, the CCD sensor 17, and the CIS 18 are included in the reader device 13 illustrated in FIG. 1 (not illustrated in FIG. 2).

A scanner image processing unit 20 performs image processing on the image data loaded on the main memory 100 by the processing of the scanner I/F unit 10 according to an operation mode (e.g., color copy, black/white copy, color scan, and black/white scan).

When reception/transmission of the data is performed between the scanner I/F unit 10 and the scanner image processing unit 20 via a ring buffer region on the main memory 100, a buffer arbitration unit 77 arbitrates writing and reading the data.

A printer image processing unit 30 is a processing unit that edits a region of the input image, converts resolution, and outputs the obtained image data via a printer. An LBP I/F 40 outputs an image processing result to the LBP unit 45 connected thereto.

When reception/transmission of the data is performed between the printer image processing unit 30 and the LBP I/F 40 via the ring buffer region on the main memory 100, a buffer arbitration unit 78 arbitrates writing and reading the data. The buffer arbitration units 77 and 78 are basically constituted in the same block. However, they are controlled by different control methods depending on a usage.

Processing units 50 and 60 are a JPEG module and a Joint Bi-level Image Experts Group (JBIG) module, respectively, and perform processing for compressing and decompressing the image data based on a predetermined standard. The memory control unit 70 is connected to a first bus 83 and a second bus 84 of the image processing system and a third bus 85 of a computer system, and performs data transfer control for writing and reading the data on the main memory (synchronous dynamic random access memory (SDRAM)) 100.

A DMA controller (DMAC) 90 operates with the memory control unit 70 and connects to a read only memory (ROM) 95 via a ROM industry standard architecture (ISA) 97 in order to generate and set predetermined address information for controlling the DMA and performing reception/transmission of the data between the main memory 100 and an external apparatus or various interfaces 170.

A DMA controller (DMAC) 91 operates with the memory control unit 70 to generate and set predetermined address information for controlling the DMA and performing reception/transmission of the data between the main memory 100, and each of the image processing units 10, 20, 30, and 40. For example, depending on a type of the image reading device and whether the CCD sensor 17 or the CIS 18 is included, the DMAC 91 generates the address information for DMA-transferring to the main memory 100 the image data on which the scanner I/F unit 10 has performed the reading processing for each DMA channel.

Further, the DMAC 91 functions as a unit that performs, together with the memory control unit 70, the DMA control between the main memory 100 and the image processing units 10, 20, 30, and 40, for example, the DMAC 91 DMA-transfers the image data loaded on the main memory 100 to the scanner image processing unit 20.

The ROM 95 stores control parameters and control program data appropriate to the image reading device (CCD sensor 17 or CIS 18). Thus, processing for inputting the image data can be performed according to a data output format for each of the CCD sensor 17 and the CIS 18, and thus no specific interface circuit is needed. Further, since the ROM 95 can store non-volatile data, the data to be stored can be stored any time regardless of whether the power is on/off.

The first bus 83 can transmit the data read from the main memory 100 to each of the processing units 10 to 60 of the image processing system. The second bus 84 can transmit the data read from each of the processing units 10 to 60 of the image processing system to the main memory 100. The first and second buses are paired to perform reception/transmission of the data between the main memory 100 and each of the image processing blocks. The third bus 85 of the computer system is connected to a CPU 180, a communication and user interface control unit 170, a mechatronics system control unit 125, a control register inside the image processing unit, and the DMAC 90.

The mechatronics system control unit 125 includes a motor control unit 110 and a timer control unit 120 that controls a motor driving timing and a timing for controlling synchronization of the processing of the image processing system. An LCD control unit (LCDC) 130 performs various settings of the image processing device and display control for displaying a processing state on the LCD 135. Universal serial bus (USB) I/F units 140 and 150 enable the image reading apparatus 101 to connect to peripheral devices.

A media access control (MAC) unit 160 is a unit for controlling with what timing the data is to be transmitted (accessed) to the connected device. When the image reading apparatus 101 communicates with another device 103 (FIG. 1) via the LAN 105, the MAC 160 is used. The CPU 180 controls an overall operation of the image reading apparatus 101.

Next, with reference to FIG. 3, scan image storage processing will be described. FIG. 3 is a diagram illustrated in a versatile manner. In comparison with FIG. 2, a scanner I/F 301 corresponds to the scanner I/F 10 illustrated in FIG. 2, an input image processing block 310 corresponds to the scanner image processing unit 20 illustrated in FIG. 2, an image encode unit 307 corresponds to the JPEG module 50 or the JBIG module 60 illustrated in FIG. 2, and an image storage memory 308 corresponds to the main memory 100 illustrated in FIG. 2.

Figure 2:
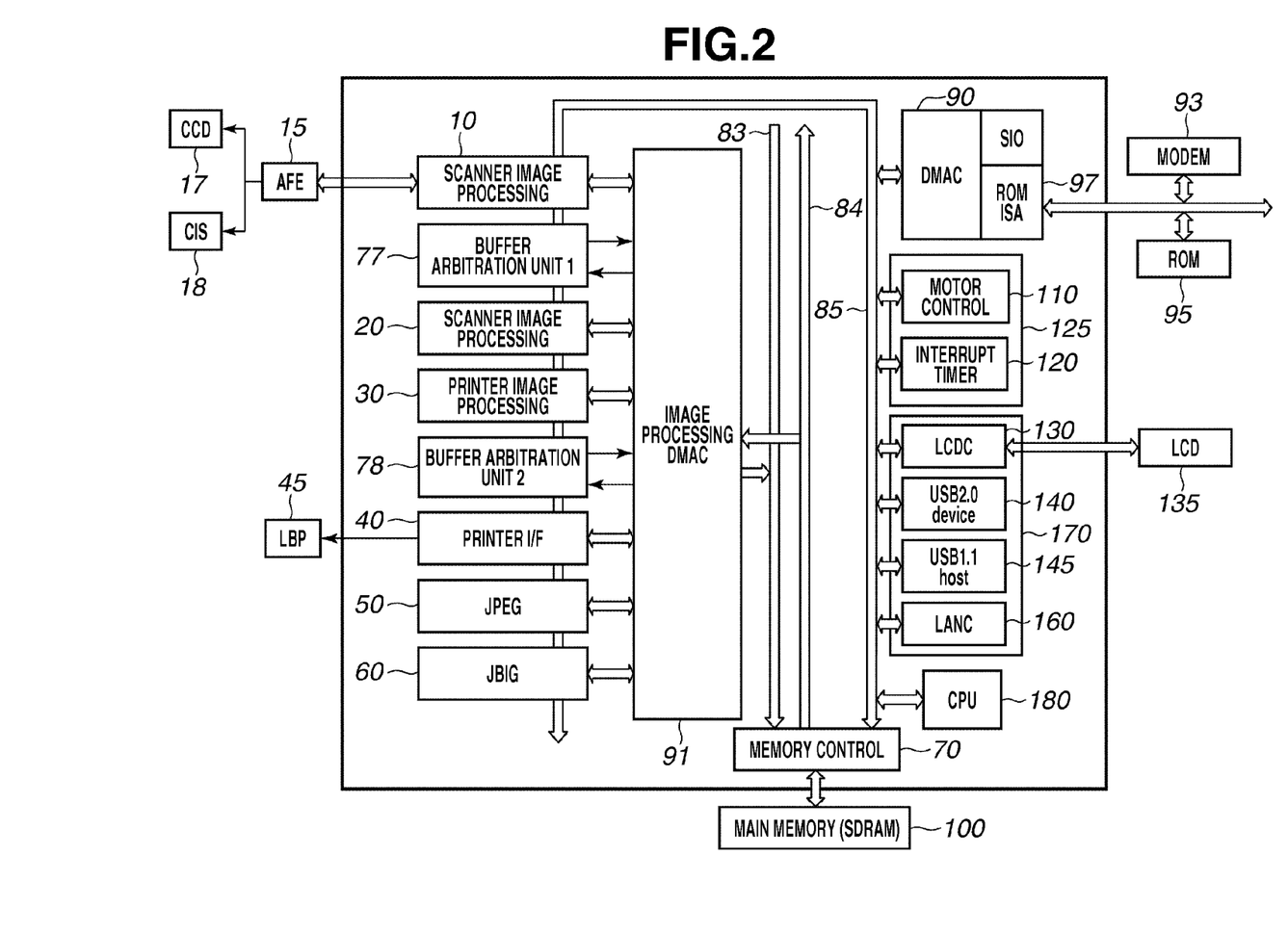
FIG. 2 is a hardware block diagram of a control device in the image reading apparatus according to an exemplary embodiment of the present invention.
Figure 3:
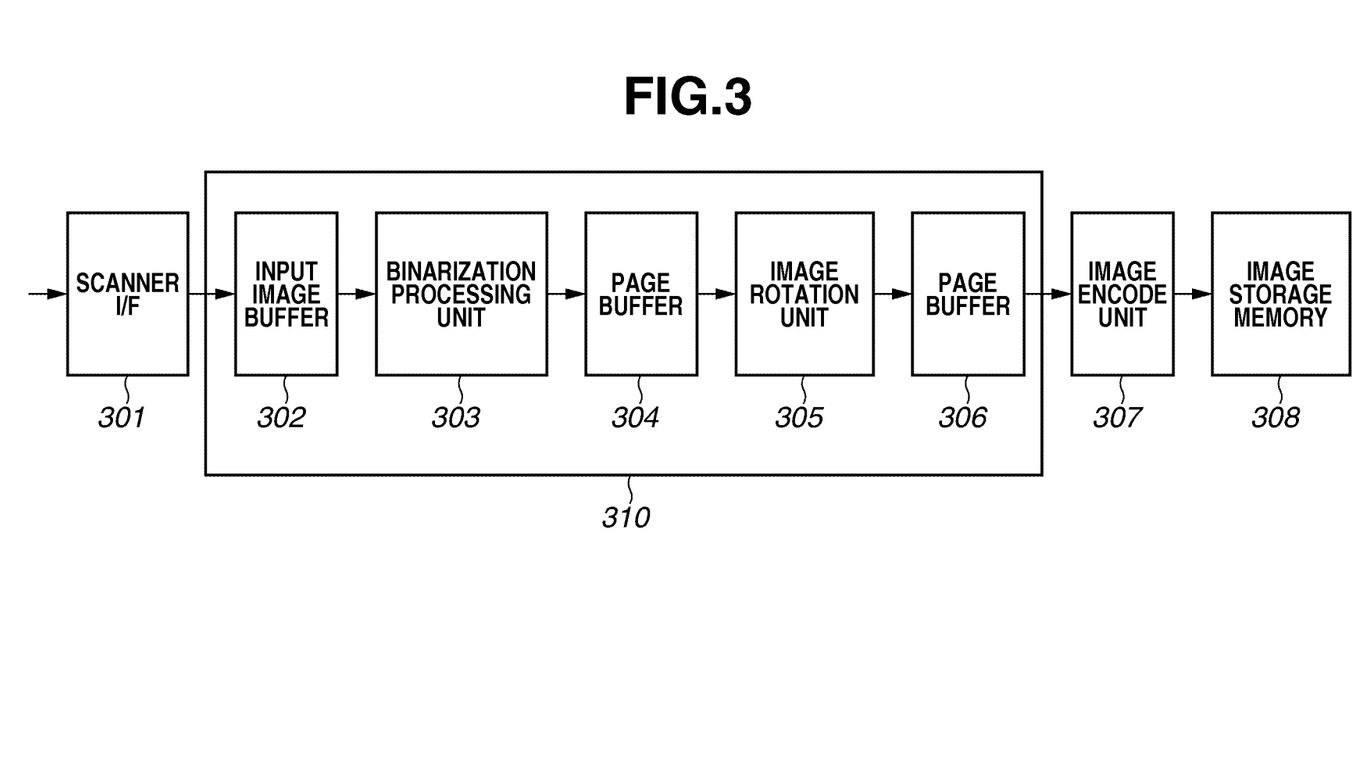
FIG. 3 illustrates scan image processing.

The scan image is once stored in an input image buffer 302 via the scanner I/F 10 (FIG. 2). At this point, the black/white image data is treated as one byte for each one pixel, and the color image data is treated as multiple values of three bytes for one pixel. The input image buffer 302 does not need to be secured for whole one page herein, and only an amount for the size of a processing unit of binarization processing subsequently performed by a binarization processing unit 303 may be secured. The binarization processing unit 303 converts a multiple-value image into a binary image for each predetermined data amount, and then stores the converted image in a page buffer 304. Next, a printer image processing unit 305 rotates the image.

Image rotation control is set from the CPU 180 via the third bus 85 of the computer system. Image rotation setting (e.g., whether to rotate, rotation direction, and rotation angle) is performed as necessary. The image on which the image rotation processing is performed is stored in a page buffer 306. Subsequently, when the image is a black/white image, the JBIG module 60 performs encode processing on the binary image stored in the page buffer 306, and when the image is a color image, the JPEG module 50 performs the encode processing on the binary image, and then an image storage memory 308 stores the encoded image.

According to the present exemplary embodiment, to perform the pull scan and the pseudo push scan, the host PC 103 performs most image processing on the images. Therefore, the image rotation unit 305 does not rotate the image nor perform the encode processing thereon, but the printer image processing unit 308 stores the scan image as it is. The main memory 100 is to be used as the printer image processing unit 308. However, the image can be stored on a hard disk (HDD) depending on a hardware configuration. The data is DMA-transferred between the above-described memory buffer and other image processing blocks by the memory control unit 70 and the DMAC 90.

Next, a transmission function will be described.

The CPU 180 executes a control program for realizing a protocol and a transmission specification stored in the ROM 95. More specifically, the CPU 180 encodes the image stored in the image storage memory 308 and adds a packet header thereto. Further, the CPU 180 transmits the image to an information device (e.g., the host PC 103) on a network via the third bus 85 and the LANC 160. According to the present exemplary embodiment, using the Transmission Control Protocol/Internet Protocol (TCP/IP), a communication for performing the pull scan and the pseudo push scan on the TCP/IP is performed. A sequence (detailed procedure) for performing the pull scan and the pseudo push scan will be described below. According to the present exemplary embodiment, the network (TCP/IP) is used as a communication unit, and further, other communication units including the USB can be also used to provide the similar processing.

Figure 4:
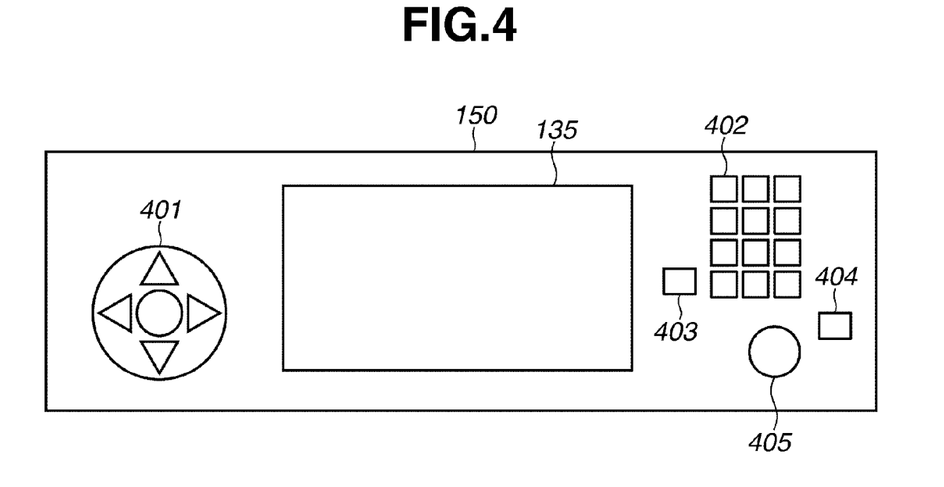
FIG. 4 illustrates an operation unit.

Next, the operation unit 150 included in the image reading apparatus 101 will be described. FIG. 4 illustrates a configuration of the operation unit 150.

The operation unit 150 includes the LCD 135, a menu selection key 401, a numeric keypad 402, a reset key 403, a stop key 404, and a start key 405. Hard keys are used for the keys 401 to 405 in the present exemplary embodiment.

The LCD 135 performs display based on control input from the LCDC 130. The menu selection key 401 includes a key for scrolling up, down, right, and left to select a menu displayed on the LCD 135 and a key for determining a selected item. The numeric keypad 402 directly inputs numeral values such as the number of copies.

The reset key 403 clears a half-setting state to return the setting to an initial value. The start key 405 gives an instruction for starting various jobs. The stop key 404 gives an instruction for stopping the started job.

Next, the scanner driver on the host PC 103 will be described. The sequence performed between the host PC 103 and the image reading apparatus 101 will be described below. Herein, the reading setting by the driver will be described.

Figure 5:
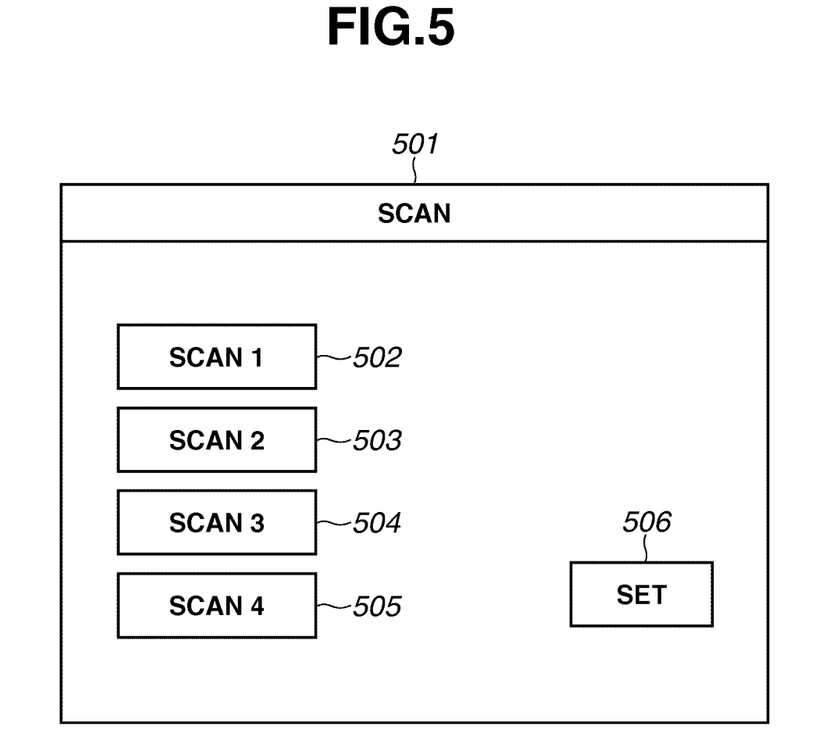
FIG. 5 illustrates a screen of a scanner driver on a host PC.

An example of a screen 501 in FIG. 5 illustrates a display on the host PC 103 when the pull scan is performed from the host PC 103. A profile about what kind of reading is to be performed is allocated to each of buttons 502 to 505. By pressing any of the buttons 502 to 505, the image reading apparatus 101 starts to read the document and transmits the read image to the host PC 103.

Figure 6:
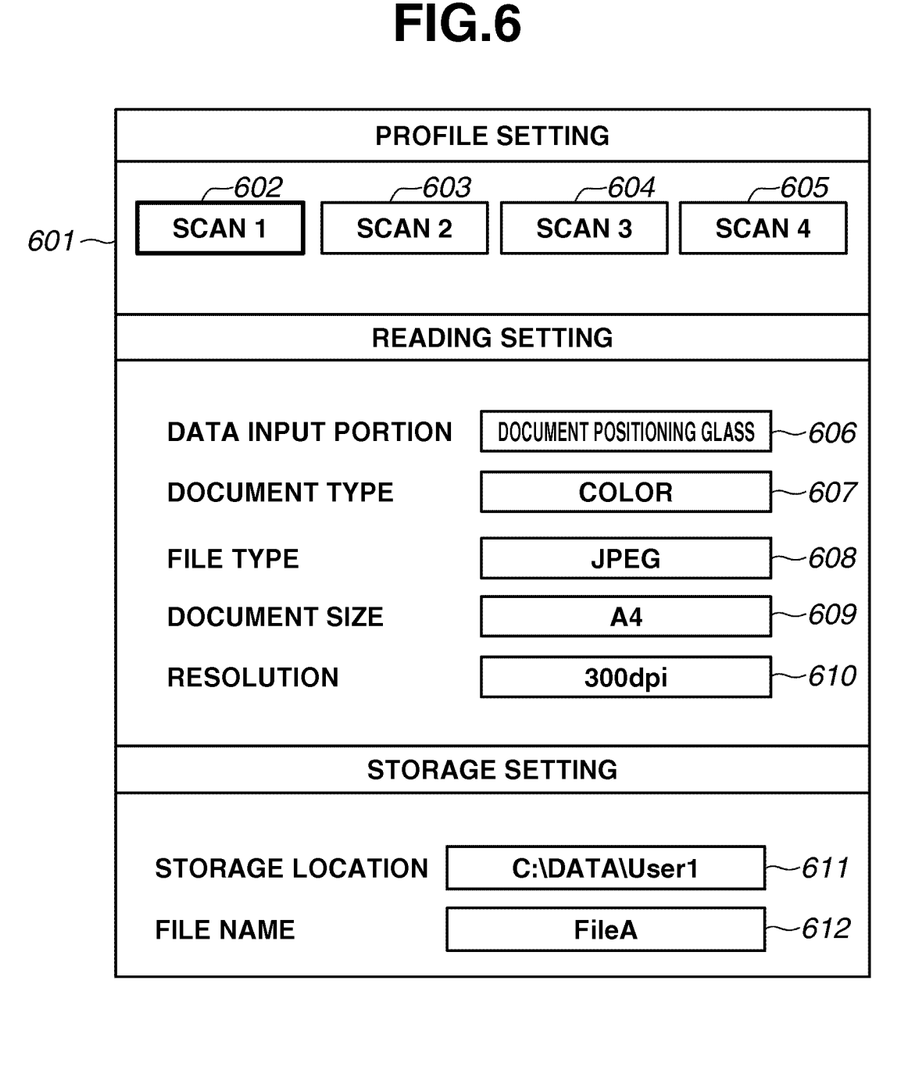
FIG. 6 illustrates a screen for the scanner driver.

Next, with reference to FIG. 6, what kind of reading setting can be performed with the buttons 502 to 505 will be described.

When pressing a "set" key 506 on a driver screen, a screen 601 is displayed. By pressing any of buttons 602 to 605, which profile of custom setting is to be performed is selected. For example, when the custom setting of a "scan 1" key is performed, the button 602 is pressed. With this selection operation, each of fields (buttons) 606 to 612 displays a set value input by the user before or a default set value. The user can change these values into desired values.

In the field 606, a method for reading a document can be selected from among the document positioning glass, an auto document feeder (ADF), and automatic. When "automatic" is selected, the apparatus determines a method for automatically reading a document according to a location on which the document is placed. In the field 607, a document type during reading can be selected. According to the present exemplary embodiment, as an option, black/white, black/white optical character recognition (OCR), gray scale, color, and color (magazine, catalog) are available.

In the field 608, the format of a file generated from the read document is specified. An example of the format that can be specified includes JPEG, Tag Image File Format (TIFF), PDF, bitmap (BMP), and graphics interchange format (GIF)).

In the field 609, the size of a document to be scanned can be specified. In the field 610, the resolution of an image to be scanned can be specified. In the field 611, a location (pass) for storing an image can be specified. In the field 612, a name of the stored file can be specified.

As described above, based on the set values for the fields 606 to 610, the image processing is performed on the read image to obtain the desired image. The image processing may be performed by either of the image reading apparatus 101 and the host PC 103. Thus, according to the present exemplary embodiment, the image processing is performed at the side of the host PC 103.

In the pseudo push scan, the image reading apparatus 101 make a request to start the pull scan, in other words, any one of the key buttons 502 to 505 is pressed to realize transmitting the image.

Figure 7:
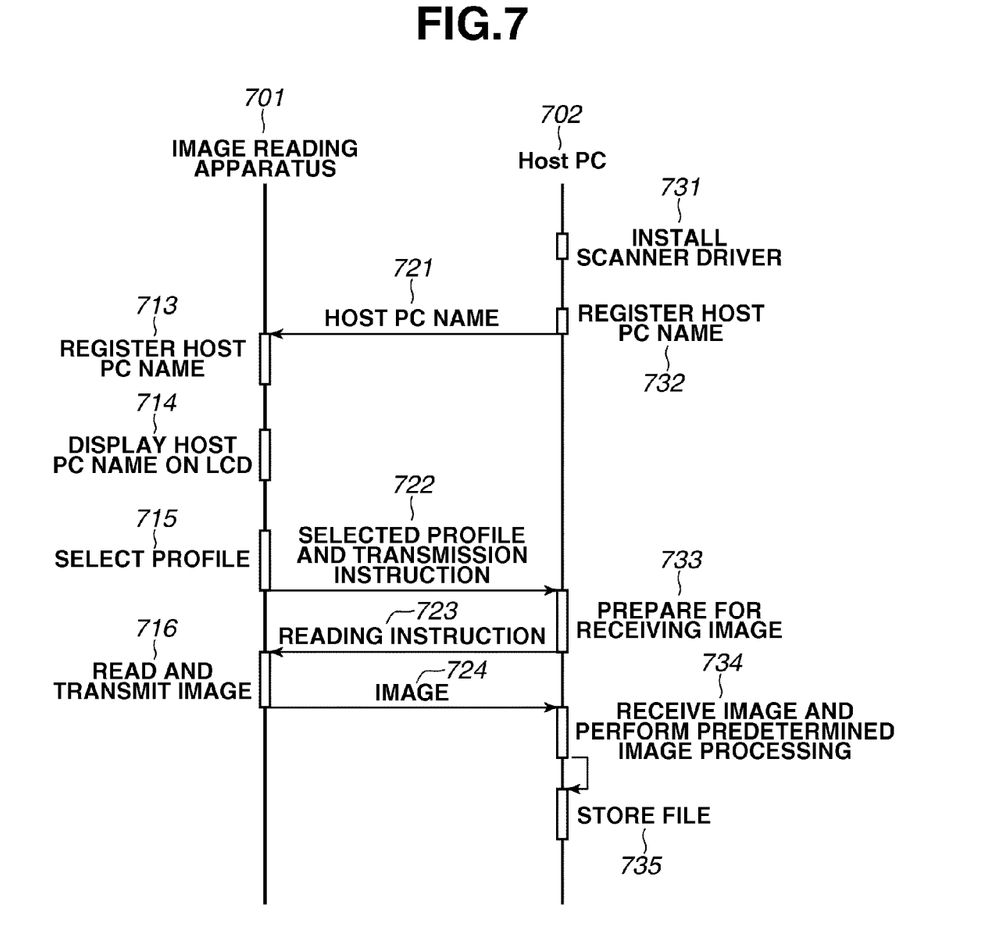
FIG. 7 illustrates a sequence between the image reading apparatus and the host PC.

Next, with reference to FIG. 7, the sequence performed between the image reading apparatus 101 and the host PC 103 for performing the pseudo push scan will be briefly described. Since the pseudo push scan has the sequence same as that of the pull scan in the middle thereof, the sequence of the pull scan will be also described.

An image reading apparatus 701 corresponds to the image reading apparatus 101 illustrated in FIG. 1, and a host PC 702 corresponds to the host PC 103 illustrated in FIG. 1. In step 731, the scanner driver is installed on the host PC 103, and then the host PC 103 can perform the pseudo push scan and the pull scan.

In step 732, the host PC transmits a host PC name and a profile name to the image reading apparatus. This step is performed with a timing described below. Further, the profile name to be transmitted is set by the user with the host PC using the screens illustrated in FIGS. 5 and 6.

A timing when a driver is installed on the host PC, and a timing when the host PC is activated;

A timing when the host PC including a multiple-user interface, as with Windows (registered trademark) of Microsoft, switches a log-on user; and A timing when setting of a driver is changed.

In step 721, information is represented that is transmitted from step 732 and includes a host PC name and a profile name. In step 713, the host PC name and the profile name are stored in the image reading apparatus 101. In step 714, the host PC name and the profile name are displayed on an operation unit of the image reading apparatus.

Figure 8:
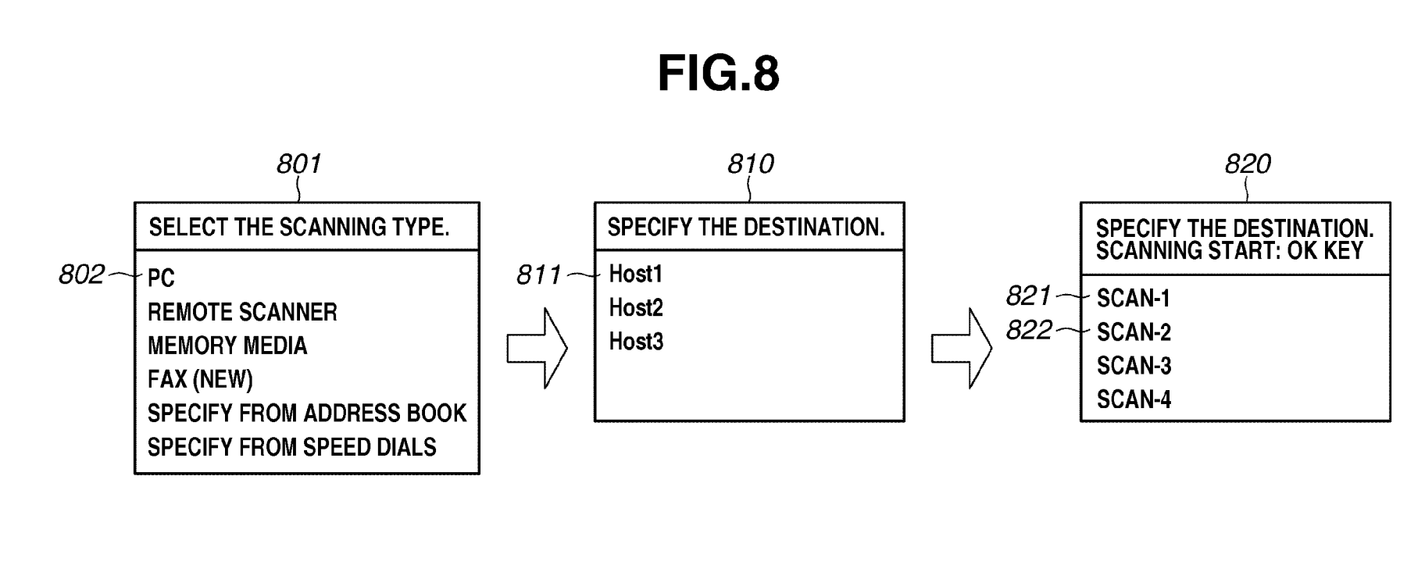
FIG. 8 illustrates screens displayed by the image reading apparatus.

A menu screen is formed to display in a selection menu of the LCD 135 the content stored in the step 713 and the profile name information statically retained by the image reading apparatus 101. At this point, the image reading apparatus displays the screens illustrated in FIG. 8 on the LCD 135. The screens illustrated in FIG. 8 will be described below together with a flowchart illustrating the processing performed by the image reading apparatus.

In step 715, the user selects the profile displayed on the operation unit in step 714, and then the image reading apparatus requests the host PC to perform the pull scan.

In step 722, a transmission instruction to the host PC and the profile selected in the step 715 are represented. In step 733, the host PC receives a request for starting the pull scan from the image reading apparatus, and then starts the pull scan. At this point, based on the content notified in step 722, the host PC determines which profile of the buttons 502 to 505 is to start the pull scan.

On the other hand, to perform the pull scan for realizing a reading operation initiated by the host PC, based on a user's instruction in step 733, the host PC determines which profile of the buttons 502 to 505 illustrated in FIG. 5 is to start the pull scan. The pseudo push scan and the pull scan have the same sequence after step 733.

In step 723, an instruction is represented for starting scanning to be notified by the host PC to the image reading apparatus.

In step 716, the image reading apparatus starts scanning based on the content instructed in step 723. In step 724, the image data read in step 716 is represented. In step 734, the host PC receives the image transmitted in step 724, and performs the image processing based on a parameter of the specified profile to generate a file. Further, as a storage location according to the present exemplary embodiment, a folder on a hard disk 611 (FIG. 6) on the host PC is previously specified, and then the file generated in step 734 is stored in the specified folder in step 735.

When the method using no document feeder is used to read the image, the sequence performed between the image reading apparatus and the host PC in steps 734 and 735 is a bit more complicated. The details will be described with reference to flowcharts illustrated in FIGS. 9 and 10.

Figure 9:
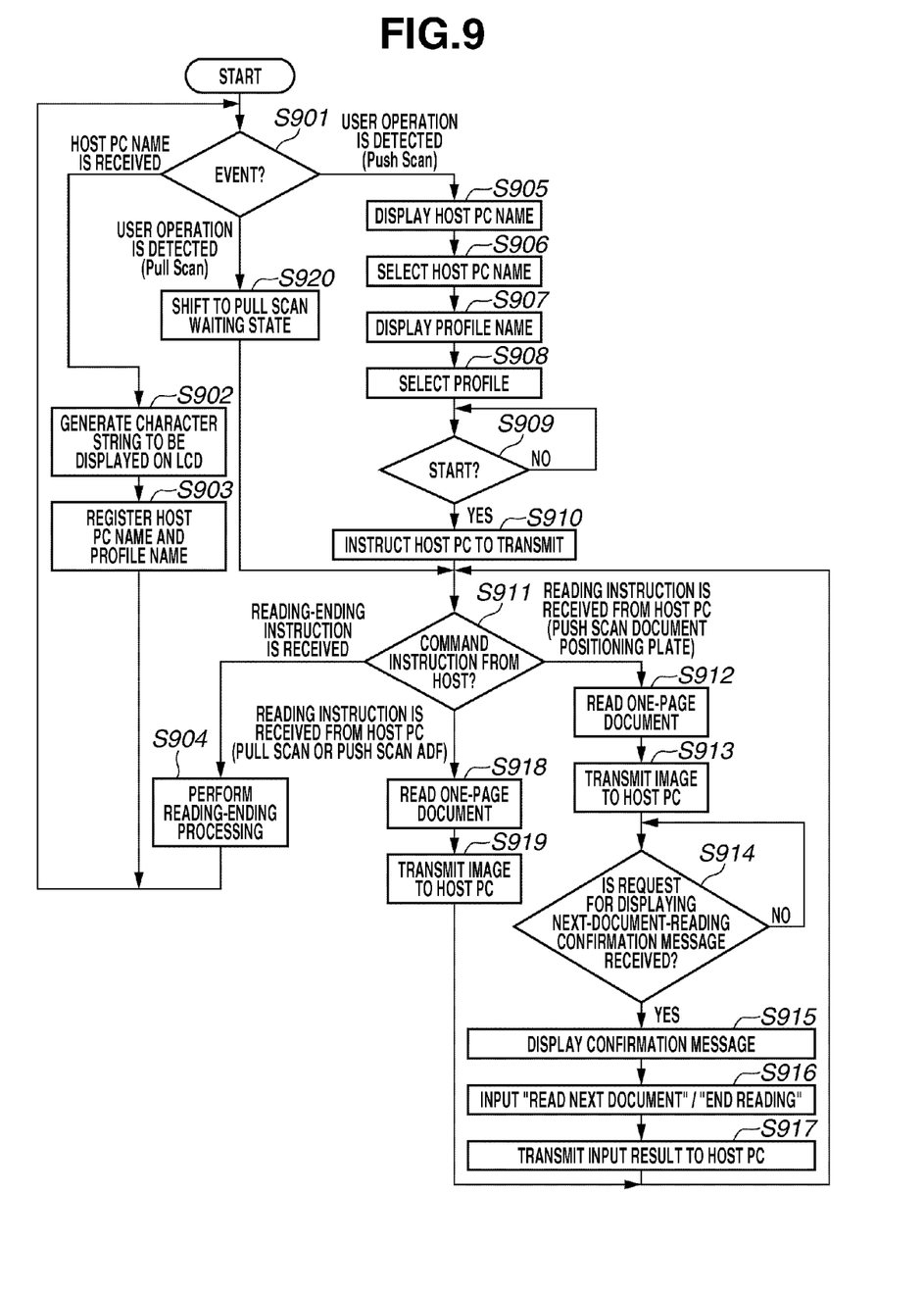
FIG. 9 is a processing flow performed by the image reading apparatus.

FIG. 9 is a flowchart illustrating a processing procedure performed by the image reading apparatus 101 according to the present exemplary embodiment. Each step illustrated in FIG. 9 can be processed when the CPU 180 of the image reading apparatus appropriately reads into the main memory 100 the program stored in a memory such as the ROM 95 and executes the program.

In step S901, the CPU 180 receives the information including the host PC name from the host PC 103 and detects a user operation. In step S902, the CPU 180 generates character strings to be displayed on the LCD 135 from the information about the host PC name and the profile name statically retained by the image reading apparatus 101. In step S903, the CPU 180 stores the character strings generated in step S902.

In step S905, the CPU 180 performs processing when the pseudo push scan is selected in the menu via the operation unit 150 in step S901, and displays on the LCD 135 the host PC name stored in step S903. Described with reference to FIG. 8, a PC 802 is selected on a scan function selection screen 801, and then a host PC selection screen 810 is displayed. On the host PC selection screen 810, the options are displayed that include host PC names and are generated in the step for forming the display character strings in step S903.

In step S906, the CPU 180 detects input via the hard key 401 and obtains information about which host PC has been selected.

In step S907, the CPU 180 displays the profile name. Described with reference to FIG. 8, a host PC 811 is selected on the host PC selection screen 810, and then a profile selection screen 820 is displayed. On the profile selection screen 820, the character strings are displayed that are profile names and generated in the step for forming the display character strings in step S902.

In step S908, the CPU 180 detects the input via the hard key 401 and obtains the information about which host PC has been selected. In step S909, the CPU 180 waits for an input via the hard key 405, and when detecting the input, the processing proceeds to step S910.

In step S910, the CPU 180 requests the host PC 103 to perform the pull scan using the image reading apparatus 101. When transmitting the request, the CPU 180 also transmits information about which profile included in the scanner driver on the host PC performs the pull scan.

In step S920, the CPU 180 shifts to a mode in which the instruction for the pull scan can be received from the host PC 103. After shifting to the mode described above, the CPU 180 does not receive any job other than the pull scan.

In step S911, the CPU 180 waits for an instruction form the host PC 103. Basically, the content of the instruction includes the document-reading instruction or the reading-ending instruction. When the document-reading instruction is received, if the pseudo push scan and the document positioning plate reading method are specified, the processing proceeds to step S912. In other cases (when the pseudo push scan and the DF reading method, the pull scan and the document positioning plate reading method, or the pull scan and the DF reading method are specified), the processing proceeds to step S918.

In step S912, the CPU 180 scans the image in the procedure described above about the scan image storage processing. In step S913, the CPU 180 transmits the image data to the host PC 103 in the procedure described above about the image transmission control.

In step S914, the CPU 180 detects reception of the request for displaying a confirmation message of reading the next document from the host PC 103. When the CPU 180 detects the request, the processing proceeds to step S915. In step S915, the CPU 180 displays a confirmation screen on the LCD 135 so that the user can select "read next document" or "end reading".

In step S916, the CPU 180 receives the user's instruction. In step S917, the CPU 180 transmits an input result obtained in step S916 to the host PC 103, and then shifts to a state in step S911 where the next command from the host PC 103 is waited for.

In step S911, when the CPU 180 receives the document-reading instruction (when the pseudo push scan and the DF reading method, the pull scan and the document positioning plate reading method, or the pull scan and the DF reading method are specified), the processing proceeds to step S918.

In step S918, the CPU 180 scans the image in the procedure described above about the scan image storage processing. In step S919, the CPU 180 transmits the image data to the host PC 103 in the procedure described above about the image transmission control. When receiving the reading-ending instruction in step S911, then in step S904, the CPU 180 performs the reading-ending processing, and then the processing returns to step S901.

Figure 10:
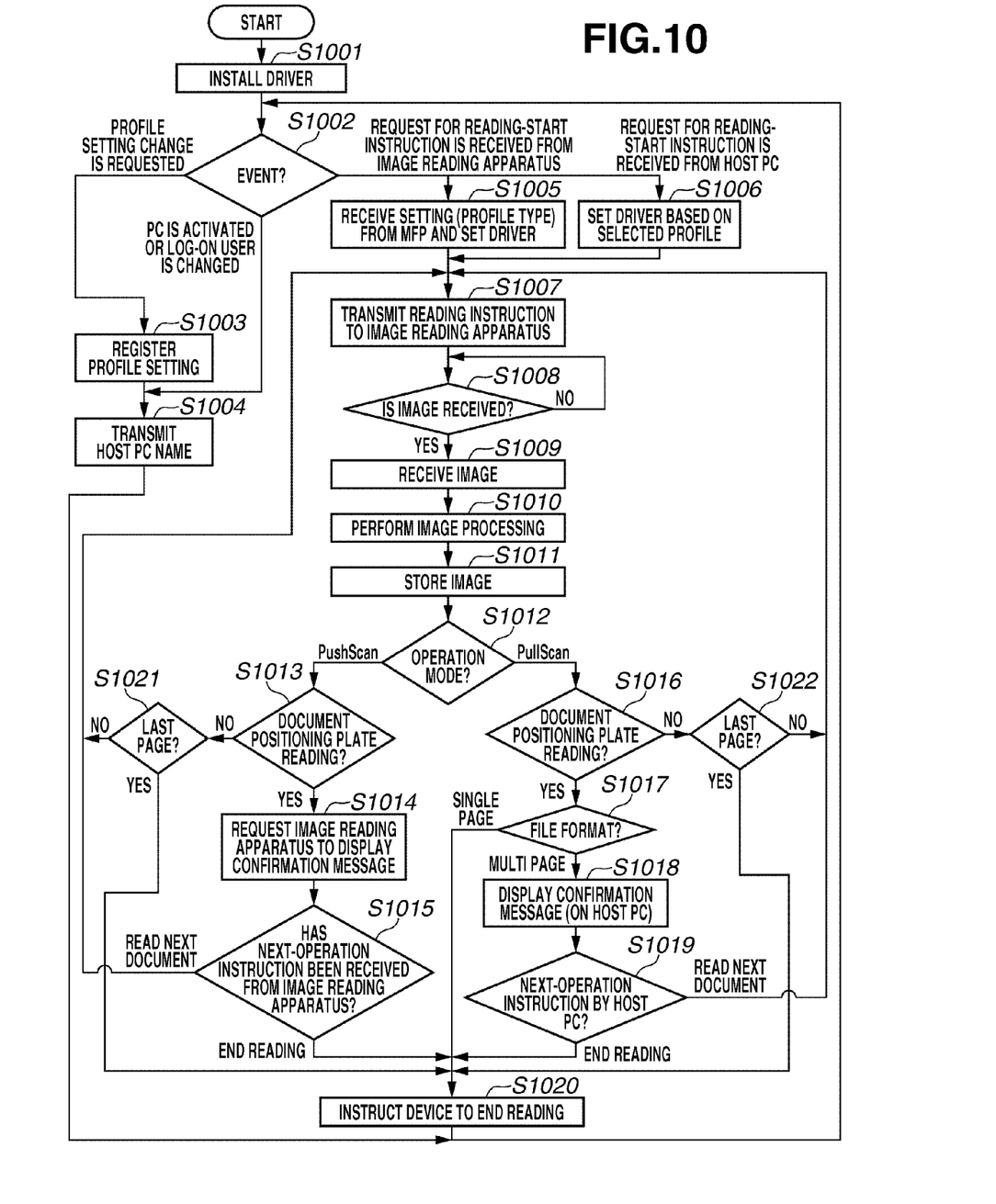
FIG. 10 illustrates a processing flow performed by the host PC.

FIG. 10 illustrates a flowchart illustrating a processing procedure performed by the host PC according to the present exemplary embodiment. Each step illustrated in FIG. 10 can be processed when the CPU of the host PC appropriately reads into the RAM the program stored in a memory such as the ROM and executes the program.

In step S1001, the scanner driver is installed on the host PC. Once the scanner driver is installed, unless it is explicitly deleted, it does not need to be installed again.

In step S1002, the host PC 103 detects various events. The detected events are described as below.

Changing profile setting on the scanner driver is requested.
The host PC is activated or the log-on user is changed.
The host PC instructs to perform (operate) the pull scan.

The image reading apparatus instructs (notifies) to perform the pull scan.

When changing the profile setting on the scanner driver has been requested in step S1002, the processing proceeds to step S1003.

In step S1003, the host PC stores the profile settings 606 to 612 changed by the user. In step S1004, the host PC transmits the host PC name to the image reading apparatus in order to generate a menu (illustrated in FIG. 8) that is displayed on the image reading apparatus when the pseudo push scan is performed (corresponding to step 721 illustrated in FIG. 7).

When the host PC is activated or the log-on user is changed in step S1002, the processing proceeds to step S1004. In this processing, the information about the profile for which the host PC waits is notified to the image reading apparatus, and the menu (illustrated in FIG. 8) that is displayed when the pseudo push scan is performed is generated. Since the processing performed in step S1004 has been described above, it will not be repeated.

When the host PC instructs (operates) to perform the pull scan in step S1002, the processing proceeds to step S1006. In step S1006, based on the profile selected by the user from among the profiles of the buttons 502 to 505, the host PC sets a reading parameter to be transmitted to the image reading apparatus.

When the image reading apparatus, which is a multifunction peripheral (MFP), instructs (notifies) to perform the pull scan in step S1002, the processing proceeds to step S1005. In step S1005, the host PC receives from the image reading apparatus a request for starting the pull scan and the selection profile information for performing the pull scan (corresponding to step 722 illustrated in FIG. 7). Based on the received information about the profiles of the buttons 502 to 505, the host PC sets the reading parameter to be transmitted to the image reading apparatus.

In step S1007, based on the setting performed in step S1005 or step S1006, the host PC transmits to the image reading apparatus an instruction for starting the pull scan to read.

In step S1008, the host PC waits to receive image data from the image reading apparatus. In step S1009, the host PC receives the image data transmitted from the image reading apparatus. In step S1010, based on the setting performed in step S1010, the host PC performs image processing on the received image data to generate a file.

More specifically, processing for converting the image data into the file format such as PDF and JPEG is performed. In step S1011, the host PC stores the generated file, with reference to the image storage location 611 and the file name 612 from the selection profile information received in step S1010.

In step S1012, the host PC determines a current operation mode. When the pseudo push scan is performed, the processing proceeds to step S1013, and when the pull scan is performed, the processing proceeds to step S1016.

In step S1013, the host PC confirms a current reading method. When the document positioning plate reading method is used, the processing proceeds to step S1014, and when the DF reading method is used, the processing proceeds to step S1007.

When the operation mode is determined to be the pseudo push scan and the document positioning plate reading method is used, the processing proceeds to step S1014. In step S1014, the host PC transmits to the image reading apparatus the request for displaying the confirmation message of reading the next document. In other words, the host PC transmits the request for displaying the confirmation screen so that the user can select whether "read next document" or "end reading", which are displayed on the image reading apparatus in step S915 illustrated in FIG. 9.

Subsequently, in step S1015, the host PC receives the instruction about the next document from the image reading apparatus, and then determines the content of the received instruction. When the instruction of "read next document" is received, the processing proceeds to step S1007 to repeat reading the image. When the instruction of "end reading" is received, the processing proceeds to step S1020.

In step S1020, the host PC transmits to the image reading apparatus the instruction for ending reading. The processing returns to step S1002, in which the host PC waits a new event to be issued.

When the operation mode is determined to be the pseudo push scan and the DF reading method is used, the processing proceeds to step S1021. In step S1021, the host PC determines whether the image reading apparatus has completed reading the images on all pages.

More specifically, when the image data is received in step S1009, the host PC determines whether information indicating the last page has been added. When the information indicating the last page has been added, as a result of the determination in step S1021, the processing proceeds to step S1020. On the other hand, when the information indicating the last page is not added, in order to continue reading, the processing proceeds to step S1007, in which the host PC transmits the image reading instruction to the image reading apparatus.

In step S1016, the host PC confirms the current reading method. When the document positioning plate reading method is used, the processing proceeds to step S1017. When the DF reading method is used, the processing proceeds to step S1022.

When the operation mode is determined to be the pull scan and the document positioning plate reading method is used, the processing proceeds to step S1017.

In step S1017, the host PC confirms the format of the file in processing. When the format of the single-page file is used, the processing proceeds to step S1020, in which the host PC transmits the reading-ending instruction to the image reading apparatus. In other words, the processing ends when one page has been read. On the other hand, when the format of the multi-page file is used, the processing proceeds to step S1018.

In step S1018, the host PC displays the confirmation screen on the display screen included in the host PC so that the user can select "read next document" or "end reading". In step S1019, the host PC receives the instruction input by the user and then determines the content of the instruction. When the instruction of "read next document" is received, the processing proceeds to step S1007, in which the host PC continuously reads the next document. On the other hand, when the instruction of "end reading" is received, the processing proceeds to step S1020, in which the host PC transmits the reading-ending instruction to the image reading apparatus.

When the operation mode is determined to be the pull scan and the DF reading method is used, the processing proceeds to step S1022. In step S1022, the host PC determines whether the image reading apparatus has completed reading the images on all pages. A specific determination method is the same as that described in step S1021. When it is determined that reading images has ended on all pages, the processing proceeds to step S1020. When it is not determined that reading images has ended on all pages, the processing proceeds to step S1007.

As described above, the image reading apparatus according to the present exemplary embodiment has the different control contents between the pseudo push scan and the pull scan using the document positioning plate. More specifically, when the pull scan is performed using the document positioning plate reading method, the processing is switched according to the format of the file to be generated. On the other hand, when the pseudo push scan is performed using the document positioning plate reading method, the processing is not switched according to the format of the file to be generated.

Further more specifically, when the pull scan is performed using the document positioning plate reading method, if the format of the single-page file is to be generated, the processing ends every time one page has been read. On the other hand, if the format of the multi-page file is to be generated, when one page has been read, the screen for asking the user whether to continue reading or end it is displayed, and then the image reading apparatus operates according to the result.

When the pseudo push scan is performed using the document positioning plate reading method, for either case of the format of the single-page file and that of the multi-page file, every time one page has been read, the screen for asking the user whether to continue reading or end it is always displayed. With this operation, the user can operate the image reading apparatus without confusion, even if the user is not conscious about (does not recognize) the format of the file to be generated.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-290331 filed Dec. 27, 2010, which is hereby incorporated by reference herein in its entirety.

What is claimed is:

1. An information processing apparatus comprising:
a communication unit configured to communicate with an image reading apparatus which reads a document;
a specifying unit configured to specify a format of a file to be generated from the document read by the image reading apparatus;
an operation unit configured to receive a reading-starting operation from a user;
a first reception unit configured to receive a transmission request for a reading instruction transmitted from the image reading apparatus;
a first transmission unit configured to transmit a reading instruction for instructing the image reading apparatus to read the document based on the reading-starting operation received from the user by the operation unit or the transmission request received by the first reception unit;
a second reception unit configured to receive image data of the document read by the image reading apparatus based on the reading instruction transmitted by the first transmission unit; and
a second transmission unit configured to, when the format specified by the specifying unit is a format of a single-page file, transmit to the image reading apparatus a reading-ending instruction according to the second reception unit receiving image data of one page, if the reading instruction is transmitted based on the reading-starting operation received by the operation unit, and to transmit to the image reading apparatus an instruction for displaying a confirmation screen for confirming whether to read a next document, according to the second reception unit receiving image data of one page, if the reading instruction is transmitted based on the transmission request received by the first reception unit.

2. The information processing apparatus according to claim 1, wherein if a user instruction for reading the next document is input when the confirmation screen is displayed, the first reception unit receives the transmission request for the reading instruction transmitted from the image reading apparatus, and the first transmission unit transmits a reading instruction for reading the next document to the image reading apparatus, based on the transmission request.

3. The information processing apparatus according to claim 1, further comprising a display control unit configured to perform control to display on a display unit included in the information processing apparatus the confirmation screen for confirming whether to read the next document, according to the second reception unit receiving image data of one page, if the reading instruction is transmitted based on the reading-starting operation received by the operation unit, when the format specified by the specifying unit is a format of a multi-page file.

4. The information processing apparatus according to claim 1, wherein when the format specified by the specifying unit is a format of a multi-page file, if the first transmission unit transmits the reading instruction based on the transmission request received by the first reception unit, the second transmission unit transmits the instruction for displaying the confirmation screen to the image reading apparatus, according to the second reception unit receiving image data of one page.

5. The information processing apparatus according to claim 1, further comprising:
a determination unit configured to determine whether the image reading apparatus has read a document by a first reading method for reading a document placed on a document positioning plate, or a second reading method for conveying a document and reading the conveyed document,
wherein when the determination unit determines that the image reading apparatus has read the document by the first reading method, the second transmission unit transmits the instruction for displaying the confirmation screen to the image reading apparatus.

6. An image reading system including an information processing apparatus and an image reading apparatus,
wherein the information processing apparatus comprises:
a specifying unit configured to specify a format of a file to be generated from a document read by the image reading apparatus;
an operation unit configured to receive a reading-starting operation from a user;

a first reception unit configured to receive a transmission request for a reading instruction transmitted from the image reading apparatus;

a first transmission unit configured to transmit a reading instruction for instructing the image reading apparatus to read the document based on the reading-starting operation received from the user by the operation unit or the transmission request received by the first reception unit; and a second reception unit configured to receive image data of the document read by the image reading apparatus based on the reading instruction transmitted by the first transmission unit;

a second transmission unit configured to, when the format specified by the specifying unit is a format of a single-page file, transmit to the image reading apparatus a reading-ending instruction according to the second reception unit receiving image data of one page, if the reading instruction is transmitted based on the reading-starting operation received by the operation unit, and to transmit to the image reading apparatus an instruction for displaying a confirmation screen for confirming whether to read a next document, according to the second reception unit receiving image data of one page, if the reading instruction is transmitted based on the transmission request received by the first reception unit, and wherein the image reading apparatus comprises:

a reading unit configured to read a document based on the reading instruction transmitted by the first transmission unit;

a third transmission unit configured to transmit image data of the document read by the reading unit to the information processing apparatus;

a third reception unit configured to receive the reading-ending instruction or the instruction for displaying the confirmation screen, transmitted by the second transmission unit; and a control unit configured to perform processing for ending reading when the reading-ending instruction is received by the third reception unit, and to perform processing for displaying the confirmation screen when the instruction for displaying the confirmation screen is received by the third reception unit.

7. An information processing method comprising:

communicating with an image reading apparatus which reads a document;

specifying, by a specifying unit, a format of a file to be generated from the document read by the image reading apparatus;

receiving, by an operation unit, a reading-starting operation from a user;

receiving, by a first reception unit, a transmission request for a reading instruction transmitted from the image reading apparatus;

transmitting a reading instruction for instructing the image reading apparatus to read the document based on the reading-starting operation received from the user by the operation unit or the transmission request received by the first reception unit;

receiving, by a second reception unit, image data of the document read by the image reading apparatus based on the reading instruction transmitted; and transmitting, when the format specified by the specifying unit is a format of a single-page file, a reading-ending instruction to the image reading apparatus according to the receiving of image data of one page by the second reception unit, if the reading instruction is transmitted based on the reading-starting operation received; and transmitting to the image reading apparatus, an instruction for displaying a confirmation screen for confirming whether to read a next document, according to the second reception unit receiving image data of one page, if the reading instruction is transmitted based on the transmission request received by the first reception unit.

8. A non-transitory computer-readable storage medium, storing a computer-executable process for executing an information processing method comprising:

communicating with an image reading apparatus which reads a document;

specifying, by a specifying unit, a format of a file to be generated from the document read by the image reading apparatus;

receiving, by an operation unit, a reading-starting operation from a user;

receiving, by a first reception unit, a transmission request for a reading instruction transmitted from the image reading apparatus;

transmitting a reading instruction for instructing the image reading apparatus to read the document based on the reading-starting operation received from the user by the operation unit or the transmission request received by the first reception unit;

receiving, by a second reception unit, image data of the document read by the image reading apparatus based on the reading instruction transmitted; and transmitting, when the format specified by the specifying unit is a format of a single-page file, a reading-ending instruction to the image reading apparatus according to the receiving of image data of one page by the second reception unit, if the reading instruction is transmitted based on the reading-starting operation received; and transmitting to the image reading apparatus, an instruction for displaying a confirmation screen for confirming whether to read a next document according to the second reception unit receiving image data of one page, if the reading instruction is transmitted based on the transmission request received by the first reception unit.

* * * * *